United States Patent

Kiuchi

[11] 4,320,273
[45] Mar. 16, 1982

[54] APPARATUS FOR HEATING AN ELECTRICALLY CONDUCTIVE COOKING UTENSIL BY MAGNETIC INDUCTION

[75] Inventor: Mitsuyuki Kiuchi, Kadoma, Japan

[73] Assignee: Matsushita Electric Industrial Company, Limited, Japan

[21] Appl. No.: 5,574

[22] Filed: Jan. 22, 1979

Related U.S. Application Data

[63] Continuation of Ser. No. 783,702, Apr. 1, 1977, abandoned, which is a continuation-in-part of Ser. No. 577,156, May 14, 1975, abandoned.

[30] Foreign Application Priority Data

| May 17, 1974 | [JP] | Japan | 49-55890 |
| May 17, 1974 | [JP] | Japan | 49-55891 |
| May 17, 1974 | [JP] | Japan | 49-55893 |

[51] Int. Cl.³ .......................... H05B 6/06; H05B 6/12
[52] U.S. Cl. .......................... 219/10.49 R; 219/10.77; 363/49; 363/79
[58] Field of Search ............ 219/10.49 R, 10.77; 363/49, 79, 80, 19, 37, 85, 86, 89, 96, 97, 124; 307/252 H, 252 N

[56] References Cited

U.S. PATENT DOCUMENTS

| 3,333,179 | 7/1967 | Freeman | 363/49 |
| 3,354,381 | 11/1967 | Temple | 363/49 |
| 3,398,352 | 8/1968 | Jameison | 363/49 |
| 3,461,374 | 8/1969 | Rhyne | 363/96 |
| 3,733,540 | 5/1973 | Hawkins | 363/89 |
| 3,908,159 | 9/1975 | Griffey | 363/85 |
| 3,925,633 | 12/1975 | Partridge | 219/10.77 |

FOREIGN PATENT DOCUMENTS

2521941 11/1975 Fed. Rep. of Germany ... 219/10.49 R

Primary Examiner—B. A. Reynolds
Assistant Examiner—Philip H. Leung
Attorney, Agent, or Firm—Robert E. Burns; Emmanuel J. Lobato; Bruce L. Adams

[57] ABSTRACT

An induction heating apparatus comprising a static power converter operative to produce high-frequency power from low-frequency power and a heating unit to produce a time-varying magnetic field in response to the high-frequency power. The power converter includes a switching circuit and control means for triggering at high frequency during an incipient stage of operation of the apparatus and lower frequency varying according to the input power to the power converter and the load of the heating unit after the incipient stage.

1 Claim, 13 Drawing Figures

APPARATUS FOR HEATING AN ELECTRICALLY CONDUCTIVE COOKING UTENSIL BY MAGNETIC INDUCTION

This is a continuation of now abandoned application, Ser. No. 783,702 filed Apr. 1, 1977 which is a continuation-in-part of application, Ser. No. 577,156 filed May 14, 1975, both now abandoned.

BACKGROUND OF THE INVENTION

The present invention relates to an induction heating apparatus which may be used as a cooking device.

The induction heating apparatus generally comprises a static power converter for converting low frequency power into high frequency power and at least one coreless heater coil which is energized by the high frequency power. When the induction heating apparatus is used as a cooking device and is subjected to a load such as a cooking pan placed in the vicinity of the heater coil, the impedance of the circuit including the heater coil varies in a broad range depending upon the material forming the load. This results in serious fluctuations in the operating conditions of the heater coil and the converter. Such a tendency is pronounced during an incipient stage of operation of the apparatus and a condition in which the heater coil is subjected to an increased load. The fluctuations in the operating conditions of the converter and the heater coil are, furthermore, caused by an unusual change in the current or the voltage applied to the heater coil and, in the result, tend to invite burn-out of the heater coil and destroy insulating materials incorporated into the heating unit. Where the heating unit consists of a plurality of heater coils, the fluctuations of impedance are caused in the individual heater coils when one heater coil is subjected to a load with another heater coil kept unloaded or when the heater coils are subjected to different loads. The present invention contemplates elimination of such problems inherent in the induction heating apparatus.

SUMMARY OF THE INVENTION

It is, accordingly, an object of the present invention to provide an induction heating apparatus which can be started in a stable condition with relatively simple control means.

It is another object to provide an induction heating apparatus which regulates output frequency of the converter so as to maintain generally constant the output power of the converter.

It is another object to provide an induction heating apparatus which regulates output frequency of the converter and disable the converter when the heater coil is subjected to overload.

It is another object to provide an induction heating apparatus which can maintain generally constant the ratio input power to output power thereof.

DESCRIPTION OF THE PREFERRED EMBODIMENTS

Figure 1:
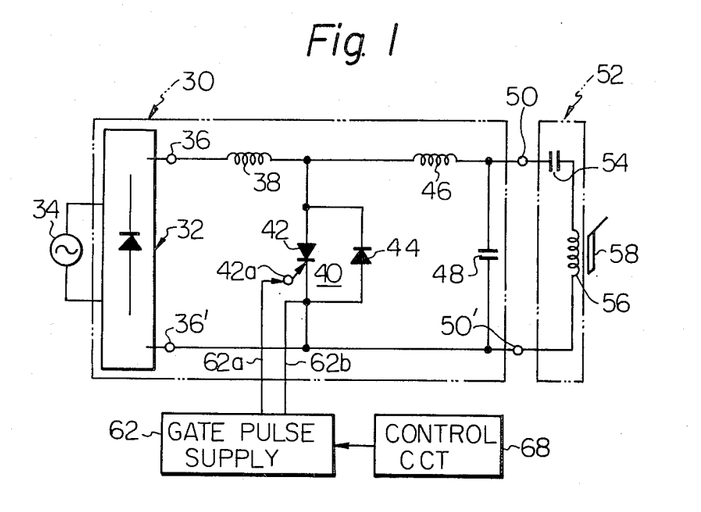
FIG. 1 is a block diagram showing an induction heating apparatus according to the present invention.

Reference will now be made to the drawings, first to FIG. 1 which illustrates a fundamental circuit arrangement of an induction heating apparatus according to the present invention. The induction heating apparatus comprises a static power converter 30 including a rectifier unit 32 connected to an a.c. power source 34 and having positive and negative output terminals 36 and 36'. Between the terminals 36 and 36' is connected a series combination of a current-limiting inductor 38 and a semiconductor switching circuit 40 consisting of a parallel combination of a silicon controlled rectifier 42 and a diode 44 which are connected in opposite directions to each other. Across the switching circuit 40 thus composed of the silicon controlled rectifier 42 and the diode 44 is connected a series combination of a commutating inductor 46 and a commutating capacitor 48 which constitute a resonance circuit. The silicon controlled rectifier 42 and the diode 44 thus have their respective anode and cathode terminals connected in parallel to the positive output terminal 36 of the rectifier unit 32 through the current-limiting inductor 38 and to one electrode of the commutating capacitor 48 through the commutating inductor 46 and their respective cathode and anode terminals connected to the negative output terminal 36' of the rectifier unit 32 and to the other electrode of the commutating capacitor 48.

Figure 2:
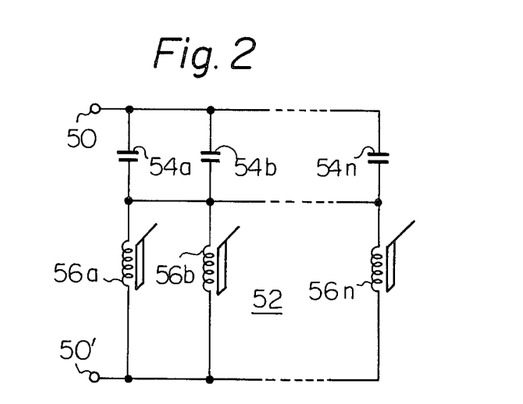
FIG. 2 shows modifications of heating unit in the induction heating apparatus.

The static power converter 30 thus arranged has positive and negative output terminals 50 and 50' and is connected to an induction heating unit 52 which consists of a series combination of a filter capacitor 54 and a heater coil 56 connected between the output terminals 50 and 50' of the converter 30. The filter capacitor 54 is adapted to block the direct current and allows only an oscillating current to flow into the coil 56. A material or load to be heated, herein assumed to be a cooking pan 58 by way of example is placed in close proximity to the heater coil 56 which usually is arranged in a spiral form. Although the induction heating unit 52 is herein shown to consist of only one heater coil 56, this is merely by way of example and, thus, the induction heating unit 52 may consist of a parallel combination of heater coils 56a, 56b, . . . 56n which are respectively connected in series with filter capacitors 54a, 54b, . . . 54n as in the arrangement shown in FIG. 2a.

In operation, the voltage delivered from the full-wave rectifier unit 32 is impressed on the silicon controlled rectifier 42, which is accordingly made conductive when supplied with a trigger pulse from the gate pulse supply circuit 62. The gate pulse supply circuit 62 is adapted to produce the trigger pulses in response to pulses from a control circuit 68. When the silicon controlled rectifier 42 is thus triggered, the voltage across the silicon controlled rectifier 42 is reduced to a substantially zero level so that an oscillating current dictated by the combined impedance of the inductors 38 and 46, capacitors 48 and 54 and the heater coil 56 flow through the switching circuit 40 composed of the silicon controlled rectifier 42 and the diode 44. As a result of the oscillating current thus produced, there is developed across the commutating capacitor 48 a voltage having a frequency equal to the frequency with which the silicon controlled rectifier 42 is triggered. A resonance current having a resonance frequency determined by the capacitance of the filter capacitor 54 and the inductance of the heater coil 56 therefore flows through the heater coil 56 with the commutating capacitor 48 operating as a power source. Eddy currents are induced in the cooking pan 58 exposed to the varying magnetic flux produced by the heater coil 56 so that the cooking pan 58 is induction heated.

Figure 3A:
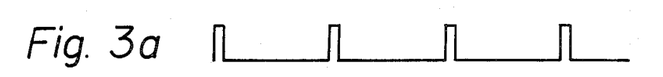
FIGS. 3a, 3b and 3c illustrate waveforms appearing in the apparatus of FIG. 1.
Figure 3B:
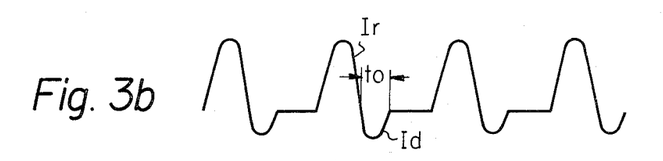
Figure 3C:
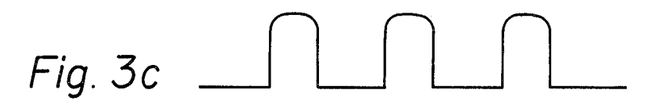
Figure 4:
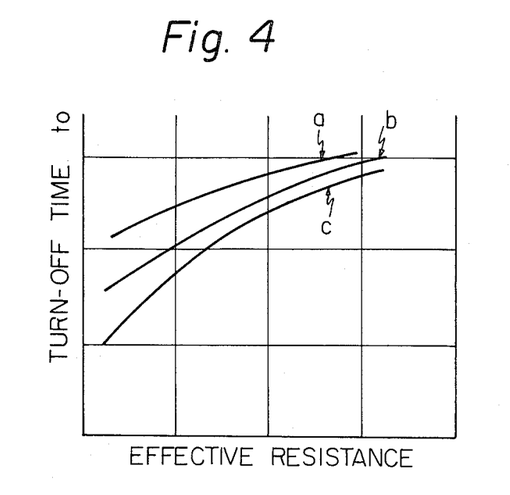
FIG. 4 is a graph showing the relation between the effective resistance of the heating unit and the turn-off time of a switching circuit used in the apparatus of FIG. 1.

The silicon controlled rectifier 42 is cyclically turned on by the trigger pulses supplied from the gate pulse supply circuit 62 and is turned off by the oscillating current produced by the series combination of the commutating inductor 46 and the commutating capacitor 48. In this instance, the commutating inductor 46 and the commutating capacitor 48 constituting an oscillating circuit are so selected as to produce a resonance frequency $f_r$ approximately doubling the frequency $f_t$ at which the silicon controlled rectifier 42 is triggered by the gate pulse supply circuit 62. FIG. 3a illustrates a train of pulses applied to the gate terminal 42a of the silicon controlled rectifier 42, whereas FIG. 3b shows the waveform of the current which flows through the switching circuit 40 composed of the silicon controlled rectifier 42 and the diode 44 and FIG. 3c shows the waveform of the voltage developed across the switching circuit 40 when the silicon controlled rectifier 42 is triggered by the pulses indicated in FIG. 3a. The current which flows in a forward direction through the switching circuit 40 as indicated by Ir in FIG. 3b is assumed to flow through the silicon controlled rectifier 42 and the current which flows in a reverse direction through the switching circuit 40 as indicated by Id is assumed to flow through the diode 44. The duration $t_o$ for which the current Id flows through the diode 44 is herein referred to as the "turn-off time" of the switching circuit 40. If the turn-off time $t_o$ of the switching circuit 40 is shorter than the turn-off time of the silicon controlled rectifier, then the current will fail to be commutated through the switching circuit 40. When, on the other hand, the heater coil 56 is subjected to a load such as the cooking pan 58, then the heater coil 56 can be represented by an equivalent circuit which consists of a series combination of the effective inductance and the effective resistance of the coil. If the resonance frequency $f_r$ produced by the series combination of the effective inductance of the heater coil 56 and the capacitance of the filter capacitor 54 approaches the frequency $f_o$ of oscillation of the converter, viz., the triggering frequency $f_t$ of the silicon controlled rectifier 42, the above-mentioned turn-off time of the switching circuit 40 becomes shorter as the effective inductance of the heater coil 56 becomes smaller. FIG. 4 illustrates general relationship between the effective resistance of the heater coil 56 and the turn-off time $t_o$ of the switching circuit 40 for different oscillation frequencies $f_o$ which are lower than one another for curves a, b and c in this sequence, wherein the effective inductance of the heater coil 56 is assumed to be of a fixed value. From the curves a, b and c it will be evident that the lower the frequency $f_o$ of oscillation of the converter 30, the shorter the turn-off time $t_o$ of the switching circuit 40. If, thus, the frequency $f_o$ of oscillation of the converter 30 is made higher than the resonance frequency $f_r$ of the series circuit of the filter capacitor 54 and the effective inductance of the heater coil 56, then the turn-off time $t_o$ of the switching circuit 40 becomes longer so that the current in the converter 30 will oscillate more easily. If, however, the oscillation frequency $f_o$ of the converter 30 becomes far higher than the resonance frequency $f_r$ of the series circuit of the filter capacitor 54 and the effective inductance of the heater coil 56, the output current of the power converter 30 and accordingly the current flowing through the heater coil 56 critically diminish so that the heater coil 56 will fail to produce a sufficient amount of magnetic flux. Such a problem will be solved if the silicon controlled rectifier 42 is triggered at a frequency higher than a prescribed normal level and accordingly the output current of the converter 30 is set at a relatively low level during an incipient stage of operation of the induction heating apparatus and if the triggering frequency of the silicon controlled rectifier 42 is diminished and accordingly the output current of the converter 30 is increased once the induction heating apparatus has been started in a steady-state condition. This will prove advantageous in view of the fact that the turn-off time of the switching circuit 40 becomes shorter when the heater coil 56 is subjected to a load to be induction heated.

Figure 5:
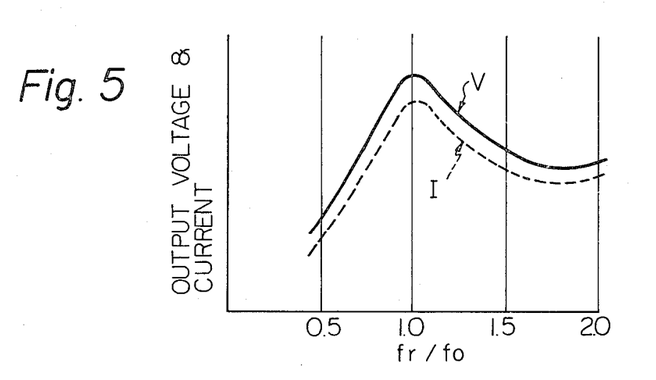
FIG. 5 is a graph showing the relation between the output power of the converter of the apparatus of FIG. 1 and ratio of resonance frequency $f_r$ of the heating unit to oscillation frequency of the switching circuit in the apparatus.

On the other hand, voltage and current produced by the power converter 30 vary in such manners as illustrated in FIG. 5 in accordance with variation ratios $f_r/f_o$ between the resonance frequency $f_r$ achieved in the heating unit 52 and the frequency of oscillation $f_o$ of the converter 30. As will be apparent from the curves of FIG. 5, the output voltage and the output current of the converter 30 vary substantially similarly to each other with the value of $f_r/f_o$. This means that the overcurrent flowing in the heating unit 52 may be detected through detection of the voltage across the heating unit. Furthermore, it is apparent that the output power of the converter 30 can be controlled by regulating the frequency of trigger pulses from the gate pulse supply circuit 62.

Figure 6:
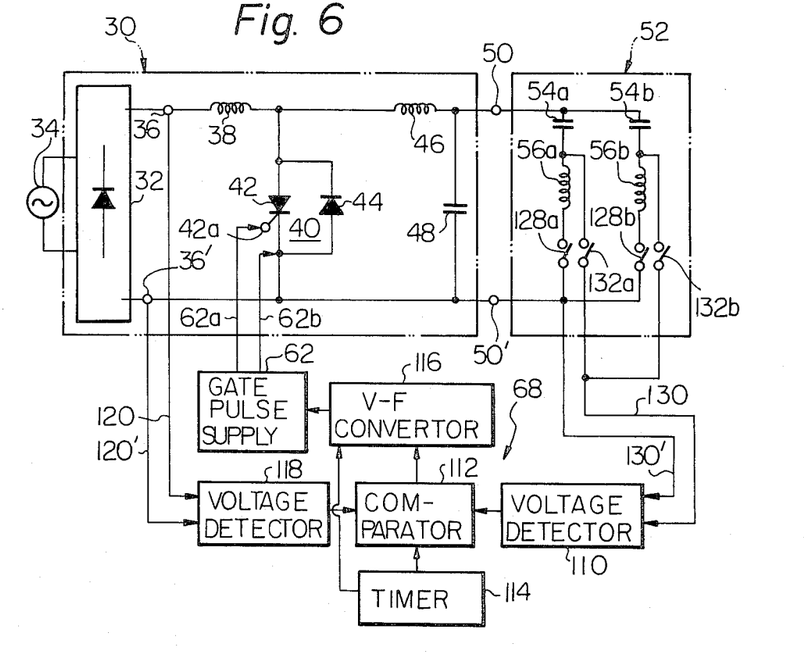
FIG. 6 is a schematic diagram of an embodiment of the present invention.

In FIG. 6, there is shown an induction heating apparatus according to the present invention, which comprises a converter 30 identically the same as the converter 30 of the apparatus of FIG. 1. An induction heating unit 52 includes a pair of heating coils 56a and 56b and filter capacitors 54a and 54b respectively serially connected with the heating coils 56a and 56b. The heating coils 56a and 56b are connected through a pair of normally-open switches 128a and 128b to the terminal 50'. The switches 128a and 132a are preferably ganged together and, likewise, the switches 128b and 132b are preferably ganged together. The switches 128a and 132a and/or 128b and 132b are manually operated so that the heater coils 56a and 56b are connected to the converter 30 independently of each other when the switches associated therewith are closed. The resonance frequency of the heating unit 52 under these conditions is substantially equal to that achieved when only one of the series combinations of the filter capacitors 54a and 54b and the heater coils 56a and 56b is connected to the converter 30.

A control circuit 68 includes a voltage detector 110 having an input terminal connected through a line 130 and normally-open switches 132a and 132b to terminals of the heater coils 56a and 56b. The other input terminal of the voltage detector 110 is connected through a line 130' to the terminal 50'. The voltage detector 110 is adapted to produce a voltage proportional to a voltage supplied thereto through the lines 130 and 130' when either pair of switches 128a and 132a or switches 128b and 132b. A voltage detector 118 is adapted to produce an output voltage proportional to the output voltage of the rectifier 32. A comparator 112 produces a voltage according to a difference between the voltages supplied thereto from the voltage detectors 110 and 118. The output voltage of the comparator 112 is applied to a voltage-to-frequency converter 116 which supplies to the gate pulse supply 62 a signal having a frequency varying in accordance with the voltage applied thereto.

Figure 7:
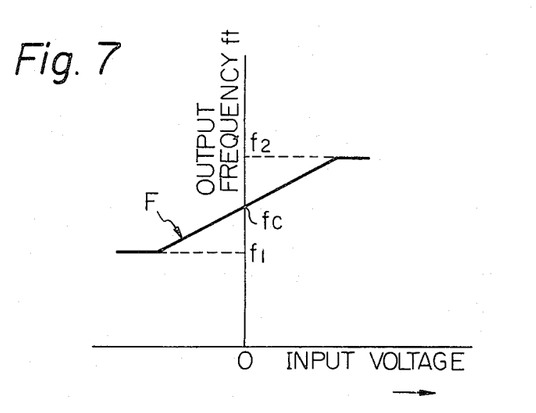
FIG. 7 is a graph showing variation of frequency of trigger pulses from a voltage-to-frequency converter of the apparatus of FIG. 6 in terms of a voltage supplied to the converter.

FIG. 7 illustrates a curve F which represents relationship between input voltage and the output frequency of the voltage-to-frequency converter 116. As seen from FIG. 7, the output frequency $f_t$ has lower and upper limits $f_1$ and $f_2$ and assumes a value $f_c$ when the input voltage is on zero level, viz., the difference between the voltages from the voltage detectors 118 and 110 is zero or a certain small value. The lower limit $f_1$ is selected to be higher than an audio-frequency range. On the other hand, the upper limit $f_2$ is selected in consideration of the fact that the SCR is disabled from being turned off if it is triggered at a frequency higher than a certain level at which the temperature at the junction of the SCR is increased to such an extent as to cause serious switching losses.

The comparator 112 cooperates with a timer 114 so that the comparator 112 produces a fixed voltage higher than normal voltages without respect to voltages from the voltage detectors 118 and 110 during an incipient stage of operation of the heating apparatus, whereby the voltage-to-frequency converter 116 produces a relatively high frequency higher than normal voltages during the incipient stage of operation after the heating apparatus is switched in. After the lapse of a predetermined time interval from when the induction heating apparatus is switched in, the timer 114 allows the comparator 112 to produce a voltage in a normal range varying in accordance with the difference between the voltages from the voltage detectors 118 and 110.

Thus, the SCR 42 is triggered by a relatively high frequency during the predetermined time interval after when the apparatus is switched in and by normal voltages according to the output voltage of the rectifier 32 and input voltage to the heating unit 52 after the lapse of the predetermined time interval from the switch-in moment of the apparatus, so that the apparatus can stably start.

Furthermore, since the SCR 42 is triggered by frequencies according to the output voltage of the rectifier 32 and the voltage across the heating coils 56a and/or 56b, the apparatus is free from any undesired overcurrents through the heating coils.

The timer 114 has another output terminal connected to the voltage-to-frequency converter 116. The timer 114 supplies a signal through the output terminal to the converter 116 so as to allow the converter to operate when the apparatus is switched in.

Figure 8:
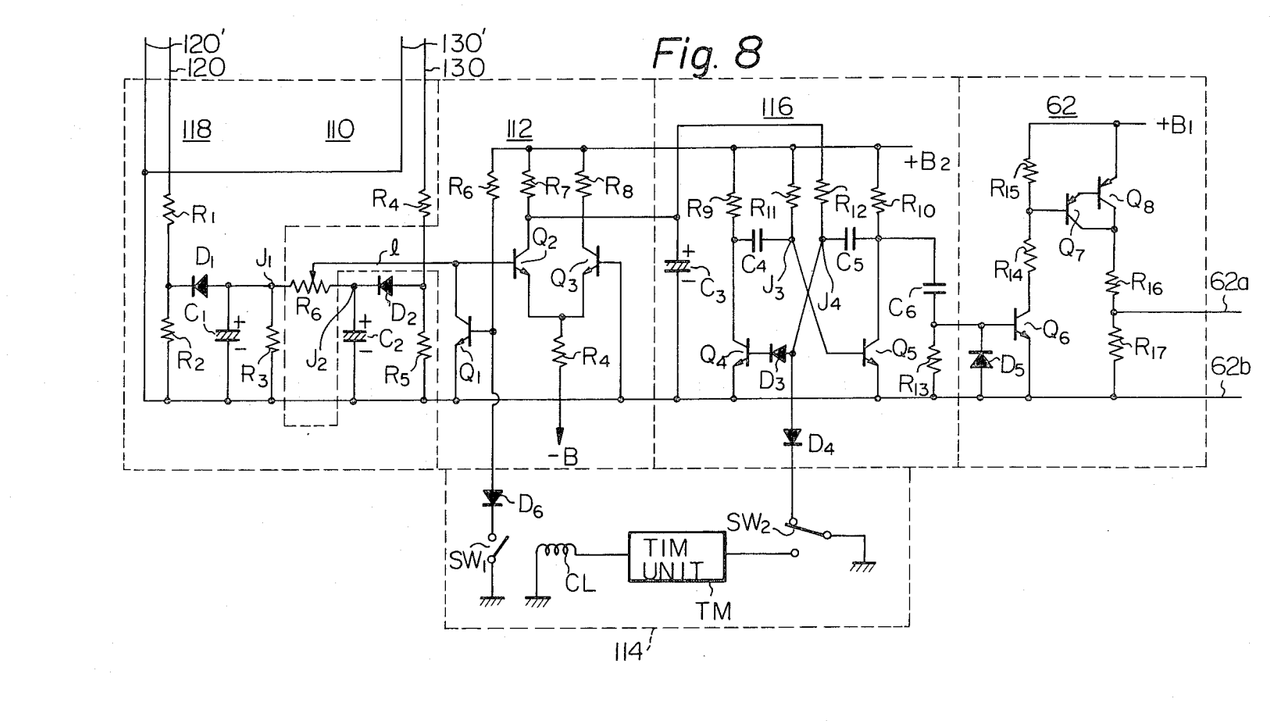
FIG. 8 is a schematic diagram showing a concrete circuit arrangement of the apparatus of FIG. 6.

In FIG. 8, there is shown a preferred circuit arrangement for the gate pulse supply circuit 62, the voltage-to-frequency converter 116, the comparator 112, the voltage detectors 118 and 110, and the timer 114.

The voltage detector 118 includes a voltage divider constituted by serially connected resistors $R_1$ and $R_2$ which are connected between the lines 120 and 120'. The voltage detector 118 further includes a diode $D_1$, a smoothing capacitor $C_1$ and a resistor $R_3$. A voltage appears at a junction $J_1$ which depends upon the voltage across the lines 120 and 120'. The voltage detector 110 includes a voltage divider constituted by serially connected resistors $R_4$ and $R_5$. The voltage detector further includes a diode $D_2$, and a smoothing capacitor. A voltage appears at a junction $J_2$, which depends upon the voltage across the lines 130 and 130'.

The comparator 112 includes a resistor $R_6$ having its terminals respectively connected to the junctions $J_1$ and $J_2$ and provided with a slidable contact. The comparator 112 includes a differential amplifier including transistors $Q_2$ and $Q_3$, and resistors $R_7$, $R_8$ and $R_9$. The base of the transistor $Q_2$ is connected through a line 1 to the slidable contact of the resistor $R_6$ so as to produce a voltage depending upon difference between voltages at junctions $J_1$ and $J_2$. The comparator 112 further includes a cut-off circuit constituted by a transistor $Q_1$ and a resistor $R_6$. The cut-off circuit functions to reduce the potential at the base of the transistor $Q_2$ to substantially zero level when a normally-open switch $SW_1$ in the timer 114 is open. In this instance, the comparator 112 produces a relatively high voltage which is applied to the voltage-to-frequency converter 116. The voltage-to-frequency converter 116 includes a smoothing capacitor $C_3$ for smoothing the voltage from the comparator 112. The voltage across the capacitor $C_3$ is applied through a resistor $R_{12}$ to a junction $J_4$ of an astable multivibrator constituted by transistors $Q_4$ and $Q_5$, capacitors $C_4$ and $C_5$ and resistors $R_9$, $R_{10}$, $R_{11}$ and $R_{12}$. The astable multivibrator oscillates in a frequency according to the potential at the junction $J_4$. The frequency from the astable multivibrator is delivered through a capacitor $C_6$ to a resistor $R_{13}$ a voltage across which is supplied to the gate pulse supply circuit 62. Diodes $D_3$ and $D_4$ are provided so that the astable multivibrator cannot operate when the base of the transistor $Q_4$ is grounded.

The gate pulse supply circuit 62 includes a transistor $Q_6$ which receives through its base the frequency signal from the voltage-to-frequency converter 116. A voltage at a junction between resistors $R_{14}$ and $R_{15}$ is amplified by an amplifier constituted by transistors $Q_7$ and $Q_8$ and resistors $R_{16}$ and $R_{17}$. The output of the amplifier is supplied to the lines 62a and 62b.

The timer 114 includes a timing unit which is triggered upon operation of a switch $SW_2$ and energizes a coil CL upon lapse of the predetermined time interval from the trigger moment. The switch $SW_1$ is closed by energization of the coil CL. When the switch $SW_2$ is operated, the voltage to frequency converter 116 starts to oscillate at a relatively high frequency until the switch $SW_1$ is operated.

When the switch $SW_1$ is operated to close the transistor Q becomes nonconductive so that, the potential at the base of the transistor $Q_2$ varies in accordance with difference between voltages at the junctions $J_1$ and $J_2$.

It is now to be understood that the voltage detectors 118 and 110 may be deleted and a constant voltage source may be connected to the line 1. In this case, the comparator 112 functions so as to produce a relatively high voltage during the predetermined time interval after the apparatus is switched in and a relatively low voltage after the lapse of the predetermined time interval after the apparatus is switched in.

Figure 9:
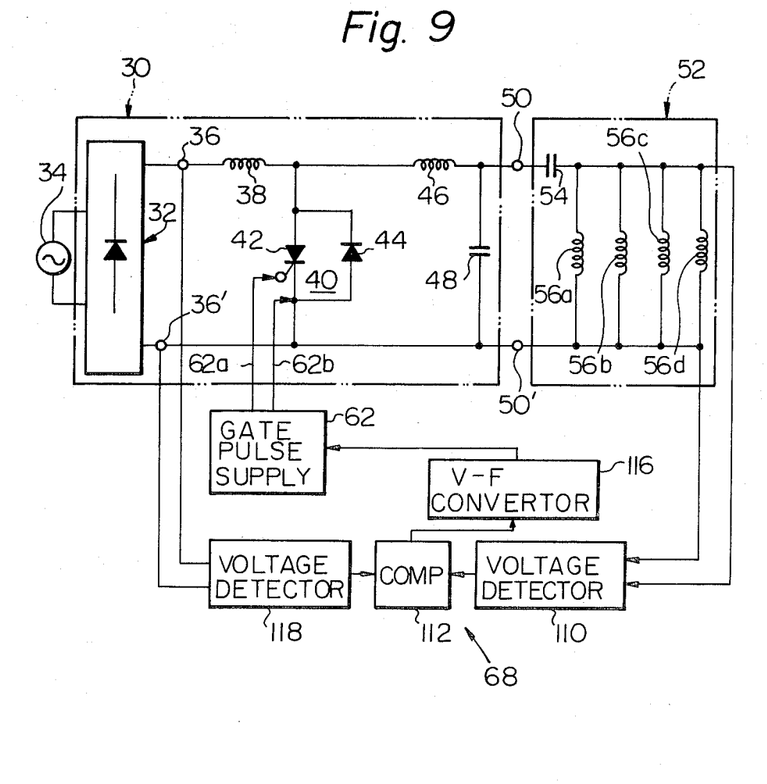
FIG. 9 is a schematic diagram showing another embodiment of the present invention.

In FIG. 9, there is shown still another embodiment of the present invention which has the same construction as that of FIG. 6, except that heating coils 56a, 56b, 56c and 56d are connected in parallel to the terminals 50 and 50' and that the timer 114 is deleted. Since the timer 114 is deleted the apparatus of FIG. 10 operates without transitional increase in frequency of trigger pulses to the SCR 42 during incipient stage of the apparatus.

Figure 10:
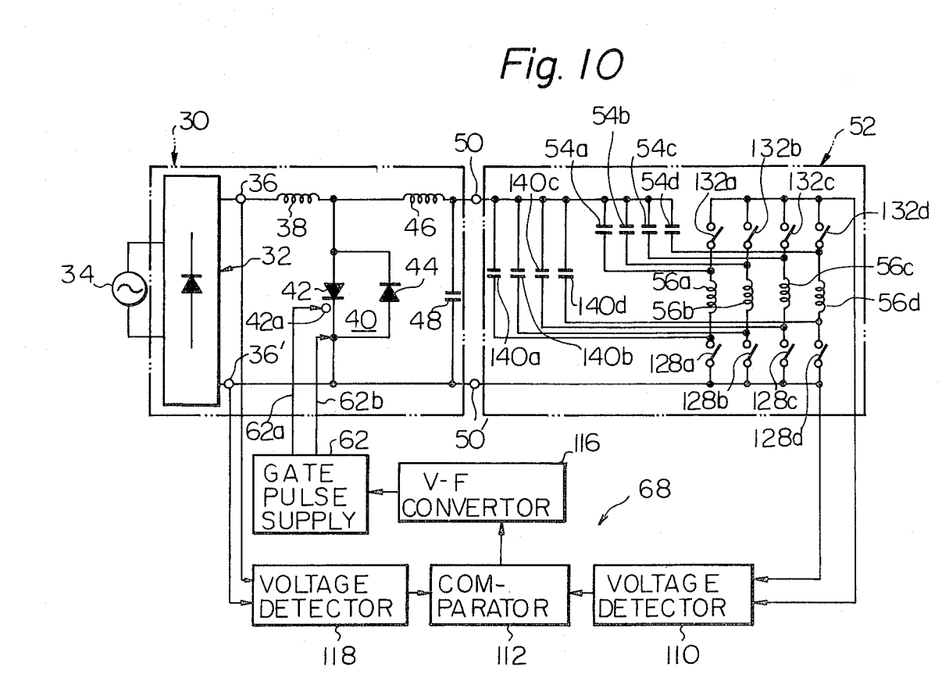
FIG. 10 is a schematic diagram showing another embodiment of the present invention.

FIG. 10 illustrates another modification of the embodiment of FIG. 6, which has the same construction as that of FIG. 6 except that the heating unit 52 is composed of four series combinations of filter capacitors 54a to 54d, heater coils 56a to 56d and switching elements 128a to 128d. The four series combinations of the filter capacitors, heater coils and switching elements are connected in parallel between the positive and negative output terminals 50 and 50' of the power converter 30. The heater coils 56a, 56b, 56c and 56d are connected in parallel to the first input terminal of the voltage detector 110 of the output control circuit 68 over switching elements 128a, 128b, 128c and 128d, respectively. The switching elements 128a, 128b, 128c and 128d are ganged with switching elements 132a, 132b, 132c and 132d, respectively, each of which is connected between the second input terminal of the voltage detector 110 and the node between each of the heater coils 56a to 56d and the associated one of the filter capacitors 54a to 54d. Each of the heater coils 56a to 56d is, thus, connected at one end to the first input terminal of the voltage detecting circuit 130 over each of the switching elements 128a to 128d and at the other end to the second input terminal of the voltage detector 110 over each of the switching elements 132a to 132d.

If the static power converter 30 to be combined with the heating unit 52 of this nature has only one commutating capacitor 48 as is the case with the converter 30 in each of the embodiments thus far described, the commutating capacitor 48 must be selected to be capable of producing a sufficient amount of commutating energy to enable all of the heater coils 56a to 56d to be concurrently energized in steady-state condition. If, in this instance, at least one of the heater coils 56a to 56d is kept de-energized with at least one of the switching elements 128a to 128d open, then the amount of commutating energy produced in the converter 30 becomes excessive for the remaining heater coils which are kept energized and gives rise to an increase in the frequency of oscillation of the converter. This results in increases in the current and voltage applied to the silicon controlled rectifier 42 of the converter 30 and accordingly in an increase in the switching loss of the silicon controlled rectifier 42. If the switching loss of the silicon controlled rectifier 42 is increased to a critical level, then the rectifier 42 will be disabled from being turned off due to the extremely increased temperature at the junctions of the semiconductor as previously discussed.

To avoid the above described problem, the static power converter 30 of the embodiment shown in FIG. 10 comprises a set of additional commutating capacitors 140a, 140b, 140c and 140d which are connected in parallel between the commutating inductor 46 and the heater coils 56a, 56b, 56c and 56d, respectively, of the heating unit 52. Each of the heater coils 56a to 56d is connected at one end to each of the filter capacitors 54a to 54d and at the other end to each of the additional commutating capacitors 140a to 140d. The commutating capacitor 48 thus connected in parallel to the additional commutating capacitors 140a to 140d is selected to have a capacitance smaller than that of the capacitance of the commutating capacitor 48 provided in the usual power converter using only one commutating capacitor. The number of the commutating capacitors in play is, in this manner, varied with the number of the heater coils which are to be energized from the converter 30 so that the amount of commutating energy produced in the converter 30 is regulated depending upon the number of heater coils energized. The current and voltage applied to the silicon controlled rectifier 42 are consequently maintained substantially constant irrespective of the number of the heater coils energized so that the silicon controlled rectifier 42 is prevented from being disabled to be turned off by the commutating current applied thereto.

Figure 11:
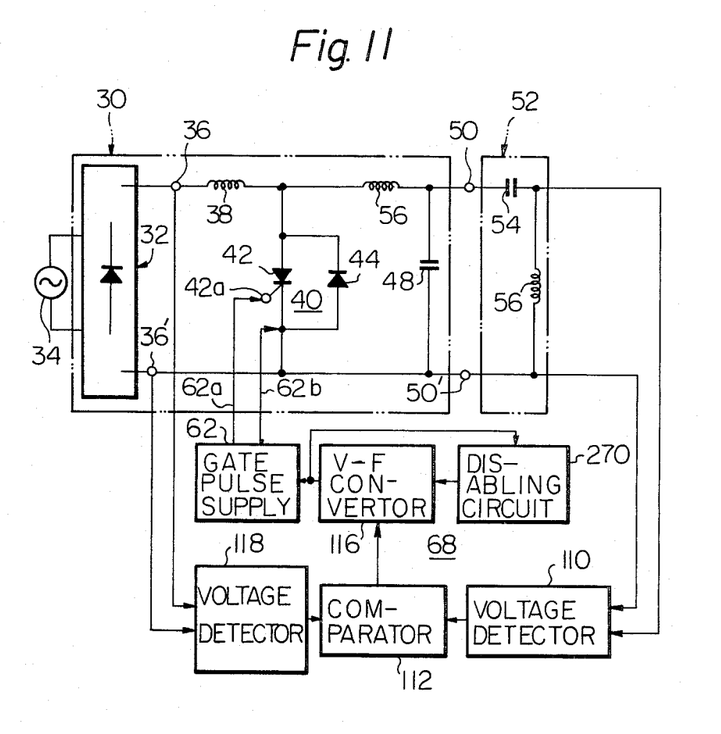
FIG. 11 is a schematic diagram showing another embodiment of the present invention.

In FIG. 11, there is shown another embodiment of the present invention, which has the same construction as that of FIG. 10 except that it further comprises a disabling circuit 270 having an input terminal connected to the output terminal of the voltage-to-frequency converter 116 and an output terminal connected to a second input terminal of the voltage-to-frequency converter 116. The disabling circuit 270 is operative to compare the frequency the output signal from the voltage-to-frequency converter 116 with a predetermined reference frequency and to disable the converter 116 from delivering the output signal to the gate pulse supply circuit 62 when the frequency of the output signal of the converter exceeds the reference frequency.

When, in operation, a non-magnetic material such as aluminum is moved closer to the heater coil 56, the effective inductance of the heater coil 56 diminishes with a consequent increase in the resonance frequency $f_r$ achieved by the series combination of the filter capacitor 54 and the heater coil 56. The ratio between the resonance frequency $f_r$ and the frequency $f_o$ of oscillation of the converter 30 is consequently changed toward the value 1 as previously discussed with reference to FIG. 5, giving rise to an increase in the voltage across the heater coil 56. The frequency $f_o$ of oscillation of the converter 30 is increased under the control of the output control circuit 68 when the output voltage of the converter 30 is increased relative to the input voltage of the converter 30 as previously discussed. When, thus, the heater coil 56 is subjected to a load of a non-magnetic material such as aluminum, then the frequency $f_o$ of oscillation of the converter 30 is increased to reduce the voltage across the heater coil 56. This results in an increase in the output voltage of the comparator 136 so that the voltage-to-frequency converter 116 controls the gate pulse supply circuit 62 to deliver trigger pulses with an increased frequency. If the frequency thus dictated by the voltage-to-frequency converter 116 reaches the prescribed reference value which is set on the disabling circuit 270, the disabling circuit 27 delivers an output signal to the voltage-to-frequency converter 116 and disables the voltage-to-frequency converter 116 from producing output signals. The power converter 30 is consequently made inoperative.

What is claimed is:

1. An induction heating cooking apparatus having a plurality of induction heating coils, means for manually selectively connecting one or more of said heating coils in one of parallel and series circuit relationships with a single inverter circuit including a switching circuit and a commutating circuit part of which is said manually connected one or more of said heating coils, and means for generating a gating signal for gating said switching circuit into conduction at a variable high frequency, said switching circuit being powered by low frequency energy when said apparatus is brought into operation to generate high frequency energy in said connected one or more of said heating coils by the action of said commutating circuit in response to said gating signal, and a feedback control circuit which comprises:

means for detecting the output power of said inverter delivered to said connected one or more heating coils;

means for detecting the input power of said inverter;

means for detecting the difference between said detected input and output power and varying the frequency of said gating signal as a function of said detected difference so that the amount of power delivered to said connected one or more of said heating coils is maintained constant, thereby effecting in said feedback control circuit a tendency to cause the frequency of said high frequency energy to reduce to a level below an inaudible frequency limit at the instant said inverter is brought into operation; and means effective for a predetermined interval in response to said inverter being brought into operation for causing the frequency of said high frequency energy to increase to a level above said inaudible frequency limit.

* * * * *